March 27, 1945.  E. A. STALKER  2,372,301
AIRCRAFT
Filed Nov. 13, 1939  3 Sheets-Sheet 1

INVENTOR
Edward A. Stalker

March 27, 1945.   E. A. STALKER   2,372,301
AIRCRAFT
Filed Nov. 13, 1939    3 Sheets-Sheet 2

INVENTOR
Edward A. Stalker

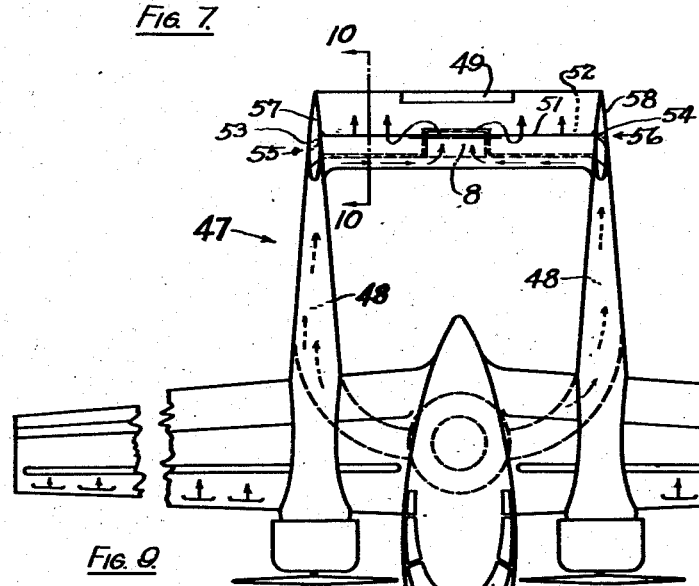

Patented Mar. 27, 1945

2,372,301

UNITED STATES PATENT OFFICE 2,372,301

AIRCRAFT

Edward A. Stalker, Ann Arbor, Mich., assignor to The Dow Chemical Company, Midland, Mich., a corporation of Michigan Application November 13, 1939, Serial No. 304,189

10 Claims. (Cl. 244—87)

My invention relates to aircraft and particularly to a means of providing stability and control. The objects are first, to provide an aerodynamic means of longitudinal control and stability rather than a means operating through the agency of movable surfaces— second, to provide a mechanical means of control employing rotation of the surface, this in combination with the said aerodynamic means; third, to provide automatic longitudinal stability; fourth, to provide an airplane of very short overall length; fifth, to provide a tail surface which is rigid and yet aerodynamically efficient. Still other objects will appear from the following description and from the drawings.

I achieve the above objects by the devices illustrated in the accompanying drawings in which:

Figure 5 is a fragmentary plan of the wing of Figure 1 to illustrate the internal compartments;

Figure 6 is a fragmentary vertical section of the wing along line 6—6 in Figure 5;

Figure 7 is a vertical chordwise section along line 7—7 in Figure 5;

Figure 9 is a fragmentary plan of an airplane employing tail booms and adapted to blowing through the tail plane;

Figure 10 is a vertical section along line 10—10 in Figure 9;

Airplanes of today are subject to tail flutter. The tail plane could be made more rigid if made relatively thicker but this has not been done because of the high drag of thick wings. I have found, however, that it is possible to use thick tail planes if they are treated in certain manners. I have found that a thick wing with end plates has for the wing itself a lower drag than if the end plates were not present. The end plates, of course, form the fins and rudders and so serve a useful purpose to compensate for their own drag. I also place slots in the tail surfaces and cause a flow through them which reduces the drag. Thereby controlling the flow differentially between the upper and lower slots I obtain longitudinal control because the slot flow also alters the lift of the tail plane.

I am aware that end plates have been used on tail planes to increase the stability by shielding the plane against loss of lift from the tip flow. Since this has been for the purpose of precluding loss of lift, the tail plane has been tapered in thickness toward the end plate with the thought of reducing the drag. The reason for present practice in this regard probably rests on erroneous interpretation of wing section experiments. All wing sections are tested with square ends and they indicate a higher drag than they should because of the large area of the thick wing cross-section and the sharpness of end corners. With end plates this area is eliminated and with it the sharp edges. Thus, the whole tail could be made thicker. Present planes have a thickness always less than 12 per cent, usually about 9 per cent of the chord length.

The present invention, then, points out that thick sections can be used at the inner and outer extremities of stabilizing planes if end plates are used. Since side loads on the vertical tail cause bending of the horizontal tail just in from the end it is important to have thickness of structure at this locality.

A tail plane provides stability to an airplane because for a given angle of pitch there is an increment of lift created on the tail. There is, however, a definite maximum to the increment for the simple tail plane. It is one of the features of this invention to provide in effect a greater tail force for a given angle of pitch of the aircraft. This is accomplished by an auxiliary vane which controls the flow through the slots of the tail plane. For a small angle of pitch of the airplane there is a small movement of the vane and a large variation in force on the tail plane.

Figure 2:
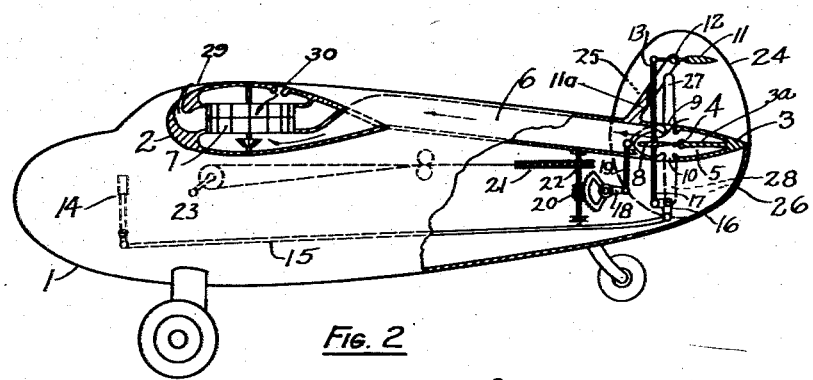
Figure 2 is a fragmentary side view partly in section.
Figure 1:
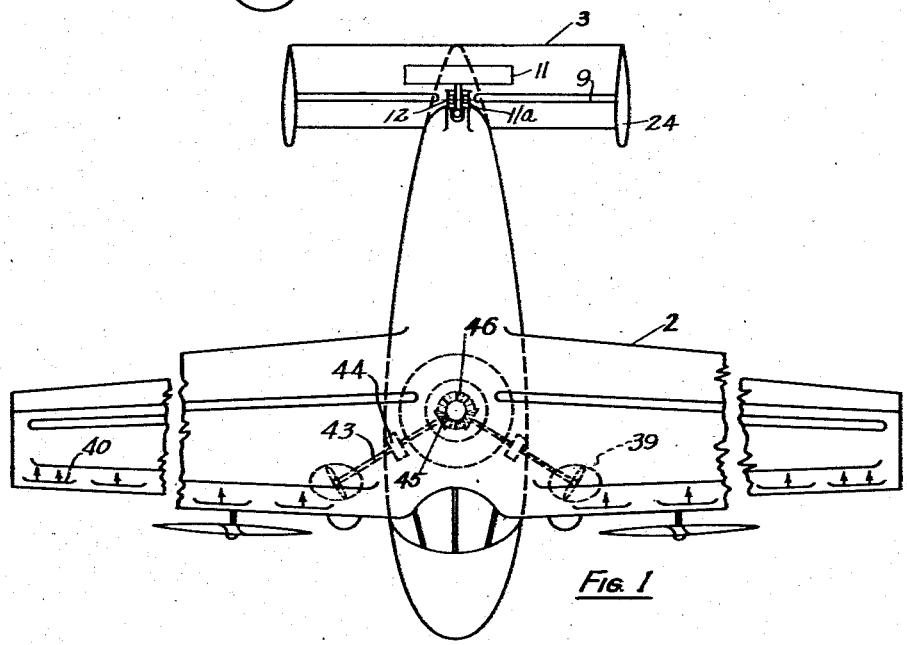
Figure 1 is a fragmentary plan view of the aircraft employing suction through a slot of the tail plane.
Figure 3:
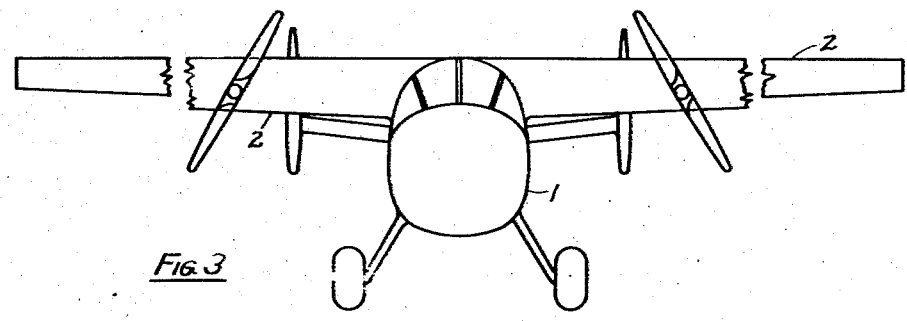
Figure 3 is a fragmentary front view of the aircraft.

Referring now to the drawings, in Figures 1, 2 and 3, the fuselage is 1 and the wings are 2. The horizontal plane or stabilizer is 3. It is hollow and divided into two compartments, an upper one 4 and a lower one 5, both having controlled communication with a duct 6 from which the air is withdrawn by a blower 7. A valve 8 is rotatable about its rear end which is hinged to the partition in the tail. By moving the front edge of the valve the suction from the duct 6 is divided to either the upper or lower slots, 9 or 10, in the surface. When air is inducted through either slot the force on the tail is increased.

To provide stability the valve 8 is controllable by the auxiliary vane 11. If the airplane deviates from its normal path the vane is deflected and directs a flow through the tail slots to create a force to correct the deviation. The vane is pivoted and suitably mass balanced about the pivot 12 and the connecting rod 13 inter-connects the vane 11 and valve 8. Suitable supports 11a pivotally support the vane on the fuselage. See Figure 1.

The valve is also connected to the control stick 14 by means of the push rod 15, bell crank 16, and connecting rod 17.

The tail plane is also adjustable by means of the bell crank 18 and rod 19. The bell crank has a segment of a toothed wheel in mesh with a worm 20 which is rotatable by the chain 21 and sprocket 22 through the rotation of the crank 23 operably connected to cables which join to the chain. Thus, two sources of controlling the tail plane are provided and either device may be used for control as well as for trimming the machine.

Figure 4:
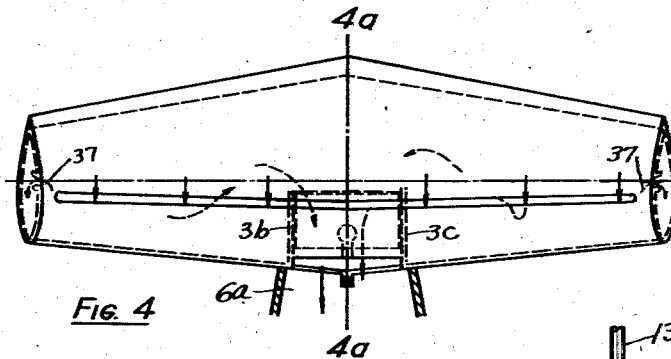
Figure 4 is a fragmentary plan of the tail of the aircraft.
Figures 4A, 8A:
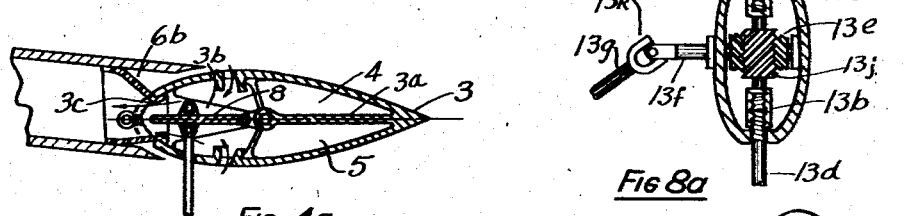
Figure 4a is a vertical section along line 4a—4a of Figure 4.
Figure 8a is a fragmentary vertical section of the turnbuckle mechanism for adjusting the attitude of vane 11 and valve 8.

As shown in Figure 4a a suitable seal 6b, preferably of rubber, prevents the leakage of fluid between the duct 6 and the stabilizer entrance 3c.

The fins 24 are hollow and divided into an upper compartment 25 above the wall 3a in the stabilizer and a compartment 26 below the wall, such compartments having communication respectively with compartments 4 and 5 of the stabilizer. Thus, when the air is sucked through a stabilizer slot, it is also sucked through the adjacent fin slot 27 or 28.

The presence of the slot in the fin is very significant because it will increase the lift of the horizontal tail by approximately 30 per cent, being somewhat dependent on the aspect ratio of the stabilizer. The effect arises from the greater mass of air that the stabilizer can deflect. This mass completely fills the space between the fins when air is passed through the fin slots. This means that the stability is increased by 30 per cent or the distance from the tail plane to the center of gravity of the airplane can be reduced by 30 per cent approximately.

The construction above described provides for differential control of the slot flows to correct for pitching movements of the aircraft. Thus when pitching movement occurs one surface of the stabilizer is toward the direction of movement of the stabilizer while the opposite surface is away therefrom. The action of the auxiliary vane 11 is such as to adjust the valve 8 to differentially control the slot flows to correct for the pitching movement and to establish a predetermined angular attitude of flight. The slot flow which takes place on the surface of the stabilizer which is away from the direction of movement is increased, and that on the opposite surface is decreased to provide corresponding changes in the respective lifts of the two surfaces in a direction to establish and maintain stability.

In Figures 5 to 7, is shown the wing in greater detail. It has an induction slot 29 and a discharge slot 30, each leading into a hollow compartment or compartments within the wing. All of the discharge slot is in communication with the compartment 31. The inner portion of the induction slot communicates with the compartment 32 while the outer or tip portion leads into compartment 33.

The walls of compartment 31 extend to the rear edge of the wing so that the top entrance of the blower inducts air through the inner portion of the slot 29 while the bottom entrance inducts air through the outer or tip portion. See particularly Figure 6.

The blower is divided at the center by a diaphragm or disk 34 so that there is no direct communication axially of the blower between compartments 32 and 33.

Besides drawing air from the compartments 32 and 33, the blower draws air from the duct 6.

In Figures 4 and 4a, the tail plane is shown in a larger scale to depict the internal arrangement, particularly of the valve 8. It should be noted that a horizontal wall 3a divides the tail into the upper and lower compartments 4 and 5 and that at the ends of the valve there are vertical walls 3b which shield the ends of the valve 8 throughout its swing and prevent leakage from one compartment to the other about the ends of the valve. These walls are fixed to the stabilizer.

Figure 8:
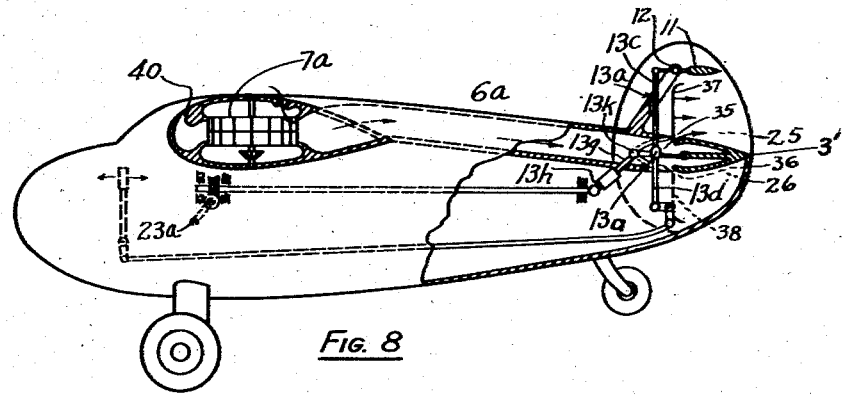
Figure 8 is a fragmentary side elevation partly in section of another form of the invention employing blowing through slots of the tail planes.

Figure 8 illustrates a form of the invention in which the tail slots have overlapping sides formed for the discharge of fluid rearward along the surface. The functioning of the machine is the same as that of Figure 1 except that the duct 6a delivers air from the blower 7a to the tail plane and the slots 35 to 38.

In Figure 8 the tail plane is rigidly attached to the fuselage and the balancing or trimming of the airplane is attained through a mechanism to alter the attitude of the auxiliary vane 11 relative to the airplane.

The connecting rod 13a is made like a turnbuckle of which parts 13b are the internally threaded barrels and 13c and 13d are the externally threaded parts. The parts have fixed to them the helical gear 13e in mesh with the helical gear 13j fixed to the shaft 13f. This shaft is turned by the crank 23a and suitable intervening gears, shafts and universal joints. In particular, shaft 13g has a splined end fitting into the internally splined end of shaft 13h so that 13h and 13g form an extensible shaft to accommodate the force and aft movement of the case 13i due to rotation of valve 8 and vane 11. The case 13i shown in section in Figure 8a, supports the gear shaft 13f.

The universal joint 13k joining shafts 13g and 13f is indicated by a circle in Figure 8 because of the small scale of the drawings.

In both Figures 1 and 5, the blowers are driven by a turbine located in a duct through the wing whose entrance on the lower surface is 39 and whose exists are 40 as shown in Figures 1 and 5. The duct is 41 shown in Figure 7. The action of this duct and turbine are discussed in my Patent No. 2,223,744, and so no detailed description is given here. The turbines in the ducts drive the blower 7 by means of gears and shafts 43 as shown in Figure 1. The bevel gear on the blower shaft is 46 and the pinion on shaft 43 is 45. The shafts 43 incorporate suitable over-running clutches 44 so that the turbines can drive the blower but one turbine can not drive the other through the blower gear. This is important in case the functioning of one turbine is impaired.

Figure 9 illustrates the application of the invention to an airplane 47 employing hollow booms 48 to support the tail.

The stabilizer is rigidly attached to the booms and trimming of the airplane is accomplished by means of the trim tab 49 in the present-day conventional manner. Air is regularly supplied to the tail plane and discharged from the slots 51 and 52 shown also in Figure 10. The vertical surfaces are divided into upper and lower compartments which communicate with the respective upper and lower compartments in the tail plane in the manner described above. The jets from these slots reduce the drag. Through slots 53 and 54 in the vertical surfaces 55 and 56 greatly increase the force on the horizontal stabilizer, by some 30 per cent as previously mentioned. The rudders 57 and 58 are hinged just back of the slots. The slots are opened wider by the movement of the rudder in one direction and closed with the opposite movement.

The greatest augmentation of the air force is obtained with a nozzle-like form for the through slots and with the structure shown this is preserved for rudder movement in one direction only. Yet this is a large gain in total force since the other plane retains at least the force of an unslotted plane.

Figure 11:
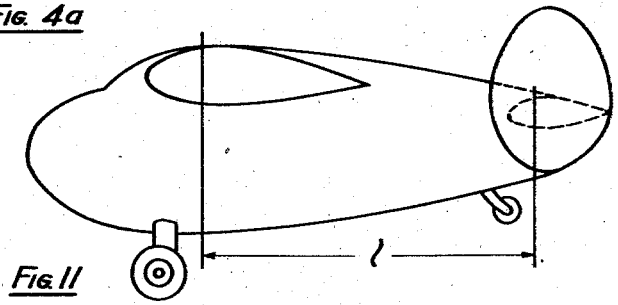
Figure 11 is a side elevation of an airplane employing the preferred tail and having a short overall length.

Figure 11 shows an airplane having the tail plane arrangement of Figure 1 or 8 described and in which advantage of the invention has been taken to reduce the overall length, particularly the length between the quarter point on the mean aerodynamic chord of the wing and the mean aerodynamic chord of the tail plane.

The mean aerodynamic chord is defined according to such standard methods as given in "Aviation Handbook" by Warner and Johnson.

Of the structures disclosed I prefer the tail plane employing discharge slots with fluid from a blower.

It is to be understood that I do not limit myself to the use of end plates on the horizontal tail plane only but intend that they may be used on vertical tail planes as well.

The type to be preferred depends on the kind of airplane. For a single motored airplane for general use I prefer the tail plane with the suction slots while with the multi-engined machine I prefer the discharge slots if tail booms are used.

The term stabilizing plane is used to mean a plane used for either stabilizing or controlling an aircraft or both.

While I have illustrated certain specific forms of the invention it is to be understood that departures can be made from them and that I intend to claim my invention broadly as set forth in the claims.

I claim:

1. In an aircraft, a hollow stabilizing plane having a slot in each of its upper and lower surfaces leading into its interior, blower means in communication with said interior to cause an inward flow through said slots, valve means to direct the major flow through either slot, pilot's steering means operably connected to said valve means to operate it, an auxiliary vane pivotally mounted to be sensitive to the wind direction, and means operably connecting it to said valve means to operate it and direct the flow to the slots differentially in accordance with the wind direction and to transmit a force to said pilot steering means.

2. In combination in an aircraft, a supporting wing, a horizontal stabilizing plane having a hollow vertical plane at its extremity, said vertical plane having a slot in its wall above and a slot in its wall below said horizontal plane, blower means in communication with the interior of said vertical plane to induce a flow through its said slots, and valve means to control the blower flow differentially between the said slots in the said vertical plane above and below said horizontal plane to vary the lift on said horizontal plane.

3. In an aircraft, a hollow stabilizing plane having a slot in each of its opposite surfaces, means for developing a flow through said slots, valve means for differentially controlling the flow through said slots, means responsive to the angular attitude of the relative wind, means actuated by said responsive means for adjusting said valve means to control said slot flows to correct for pitching movements of said aircraft, and manual means for altering the control of said valve means to provide for establishing a predetermined angular attitude of flight.

4. In an aircraft, a hollow stabilizing plane having a slot in each of its opposite surfaces, means for developing an inward flow through said slots, valve means for differentially controlling the flow through said slots, means responsive to the angular attitude of the relative wind, means actuated by said responsive means for adjusting said valve means to differentially control said slot flows to correct for pitching movements of said aircraft, and means for altering the control of said valve means to provide for increasing the slot flow on the one of said surfaces away from the direction of movement of said stabilizing plane.

5. In an aircraft, a hollow stabilizing plane having a slot in each of its upper and lower surfaces, blower means within the aircraft for developing an inward flow through said slots, valve means for differentially controlling the flow through said slots, means responsive to the angular attitude of the relative wind, means actuated by said responsive means for adjusting said valve means to differentially control said slot flows to correct for pitching movements of said aircraft, and means for altering the control of said valve means to provide for increasing the slot flow on the one of said surfaces away from the direction of movement of said stabilizing plane and to decrease the slot flow on the other of said surfaces toward said relative wind.

6. In combination in an aircraft, a hollow stabilizing plane having a slot in each of its upper and lower surfaces in communication with the plane interior, blower means in the aircraft in communication with said slots to supply a flow therethrough, valve means for controlling the respective flows through said slots, means to adjust the position of said stabilizing plane relative to the aircraft, and means operable connecting said valve means so that in response to adjusting movement of said stabilizing plane said valve means directs a flow to the slot on the side of said plane opposite that in the direction of said adjusting movement.

7. In combination in an aircraft, a hollow stabilizing plane having a slot in each of its upper and lower surfaces in communication with the interior of the aircraft, blower means in the aircraft in communication with said slots to supply a flow therethrough, valve means for controlling the respective flows through said slots, means to adjust said valve means to vary the flows through said slots differentially, additional means to adjust the position of said stabilizing plane relative to the aircraft, and means operably connecting said valve means so that in response to adjusting movement of said stabilizing plane said valve means effects a differential variation in the flows through said slots.

8. In combination in an aircraft, a hollow stabilizing plane having a slot in each of its upper and lower surfaces in communication with the interior of the aircraft, blower means in the aircraft in communication with said slots to supply a flow therethrough, valve means for controlling the respective flows through said slots, means to adjust said valve means to vary the flows through said slots differentially, additional means to adjust the position of said stabilizing plane relative to the aircraft, and means operably connecting said valve means so that in response to adjusting movement of said stabilizing plane said valve means effects a differential variation in the flows through said slots, and means responsive to the angular attitude of the relative wind for also effecting adjustment of said valve means.

9. In an aircraft, a hollow stabilizing plane having a slot in each of its opposite surfaces, means within the aircraft for developing a flow through said slots, valve means for controlling the flow through said slots, said valve means being positioned within and closely adjacent said stabilizing plane to be effective promptly for the control of said flows, manual means remotely located with respect to said valve means, and means for interconnecting said manual means and said valve means to provide for the adjustment of the latter.

10. In an aircraft, a hollow stabilizing plane having a slot in the surface thereof, impositive displacement blower means within the aircraft for developing a low pressure flow through said slot, valve means for controlling the flow through said slot, said valve means being positioned within and closely adjacent said stabilizing plane to be effective promptly for the control of said flow, manual means remotely located with respect to said valve means, and means for interconnecting said manual means and said valve means to provide for the adjustment of the latter.

EDWARD A. STALKER.